United States Patent
Levine et al.

(10) Patent No.: US 8,423,972 B2
(45) Date of Patent: Apr. 16, 2013

(54) COLLECTING PROFILE-SPECIFIED PERFORMANCE DATA ON A MULTITHREADED DATA PROCESSING SYSTEM

(75) Inventors: Frank Eliot Levine, Austin, TX (US);
Milena Milinkovic, Madison, AL (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 12/394,428

(22) Filed: Feb. 27, 2009

(65) Prior Publication Data

US 2010/0223598 A1    Sep. 2, 2010

(51) Int. Cl.
    *G06F 9/44*    (2006.01)
(52) U.S. Cl.
    USPC .......................................................... 717/130
(58) Field of Classification Search .......... 717/127–131; 714/38.11, 45, 47.1, 25; 712/205, 227, 244; 709/223; 718/103, 108; 710/1; 702/182, 702/186
    See application file for complete search history.

(56) References Cited

U.S. PATENT DOCUMENTS

| | | | |
|---|---|---|---|
| 5,835,705 A | 11/1998 | Larsen et al. | |
| 6,018,759 A * | 1/2000 | Doing et al. | 718/108 |
| 6,052,708 A * | 4/2000 | Flynn et al. | 718/108 |
| 6,256,775 B1 * | 7/2001 | Flynn | 717/127 |
| 6,658,654 B1 | 12/2003 | Berry et al. | |
| 6,925,424 B2 | 8/2005 | Jones et al. | |
| 6,931,354 B2 | 8/2005 | Jones et al. | |
| 7,197,652 B2 | 3/2007 | Keller, Jr. et al. | |
| 7,278,057 B2 | 10/2007 | Betancourt et al. | |
| 2004/0006724 A1 * | 1/2004 | Lakshmanamurthy et al. | 714/25 |
| 2004/0267916 A1 * | 12/2004 | Chambliss et al. | 709/223 |
| 2005/0071515 A1 * | 3/2005 | DeWitt et al. | 710/1 |
| 2006/0230391 A1 * | 10/2006 | Alexander et al. | 717/130 |
| 2006/0253745 A1 * | 11/2006 | Maso et al. | 714/47 |
| 2007/0169055 A1 | 7/2007 | Greifeneder | |
| 2007/0220495 A1 * | 9/2007 | Chen et al. | 717/130 |

* cited by examiner

*Primary Examiner* — Tuan A Vu
(74) *Attorney, Agent, or Firm* — Yee & Associates, P.C.; David A. Mims, Jr.

(57) ABSTRACT

A method, apparatus, and computer program product for collecting performance data. In one illustrative embodiment, signaling is performed to start collecting the performance data by an operating system support unit in a multithreaded data processing system. Responsive to a thread switch to an incoming thread after signaling has occurred, the performance data for the incoming thread is collected using a thread specific data collection profile to form collected performance data if the incoming thread is associated with the thread specific data collection profile, wherein the thread specific data collection profile specifies a type of data to collect. Responsive to a subsequent thread switch, the collected performance data is sent to a number of destinations.

20 Claims, 7 Drawing Sheets

COLLECTING PROFILE-SPECIFIED PERFORMANCE DATA ON A MULTITHREADED DATA PROCESSING SYSTEM

BACKGROUND

1. Field of the Invention

The present invention relates generally to an improved data processing system and more specifically to a method and apparatus for collecting data. Still more particularly, the illustrative embodiments provide a computer implemented method, apparatus, and computer program code for collecting performance data in a multithreaded data processing system.

2. Description of the Related Art

Effective management of a data processing system requires knowing how and when different resources within a data processing system are being used. In analyzing and enhancing the performance of a data processing system and applications executed within the data processing system, it is often useful to collect information about the execution of the applications within the data processing system. Performance tools have been used to monitor and examine a data processing system to identify resource consumption as various software applications execute on the data processing system.

For example, a performance tool may identify the most frequently used modules and instructions in a data processing system. A performance tool also may identify those modules which allocate the largest amount of memory, or those modules which perform the most input/output requests. Hardware based performance tools may be built into a data processing system and in some cases may be installed at a later time. Software based performance tools may generally be added to a data processing system at any time. This type of performance monitoring may be especially useful in multithreaded data processing systems.

A multithreaded data processing system is a data processing system in which multiple threads may execute. This type of execution may involve time division multiplexing or time slicing in which one or more processors switch between different threads. The context switching may occur quickly enough that an end user perceives the threads as executing simultaneously. With a multiprocessor or multicore system, multithreaded execution may be performed in which different threads may execute simultaneously on different processors or cores. Collection of performance data, in these types of systems, also uses resources on the data processing system. For example, memory and processing resources may be used to store and process the performance data. Often times, memory and processing resources may be limited. These limitations may occur because of a desire to avoid or reduce any impact on the performance of the data processing system.

Existing processes may perform performance monitoring via remote communication. For example, the data processing system in which performance data is collected may be sent to remote data processing systems for storage and analysis. One example is a remote debugger interface (RDI), which is a software debugger that can remotely connect to a data processing system to collect debugging information. Another example is Xdebug, which is a debugger for PHP scripts. These types of interfaces allow for the collection of stack traces, function traces, and error messages, as well as obtaining profiling information of the execution of applications.

These types of approaches, however, may be inefficient when monitoring multiple data processing systems. The transmission or streaming of data may require network resources that may slow down the performance of a network.

BRIEF SUMMARY

One or more illustrative embodiments provide a computer implemented method, an apparatus, and a computer program product for collecting performance data. In one illustrative embodiment, signaling is performed to start collecting the performance data by an operating system support unit in a multithreaded data processing system. Responsive to a thread switch to an incoming thread after signaling has occurred, the performance data for the incoming thread is collected using a thread specific data collection profile to form collected performance data if the incoming thread is associated with the thread specific data collection profile, wherein the thread specific data collection profile specifies a type of data to collect. Responsive to a subsequent thread switch, the collected performance data is sent to a number of destinations.

DETAILED DESCRIPTION

Figure 1:
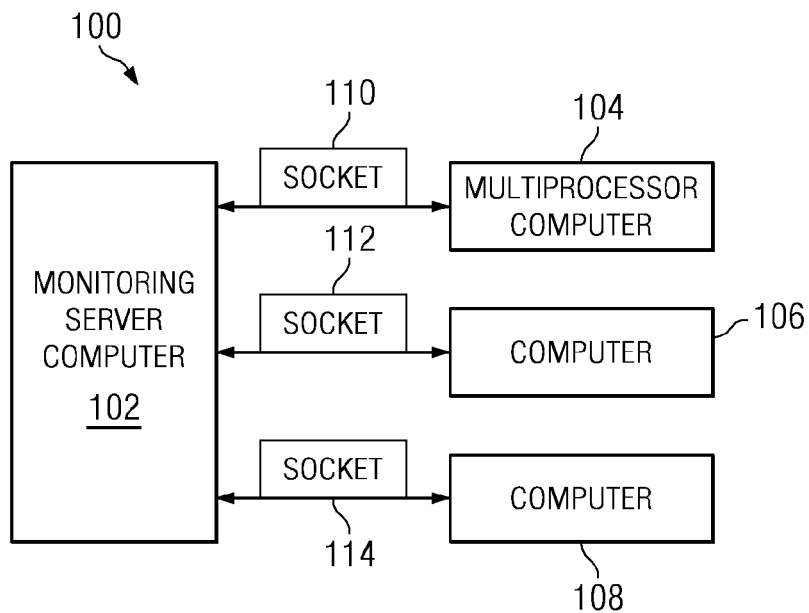
FIG. 1 is a diagram of a network of data processing systems in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
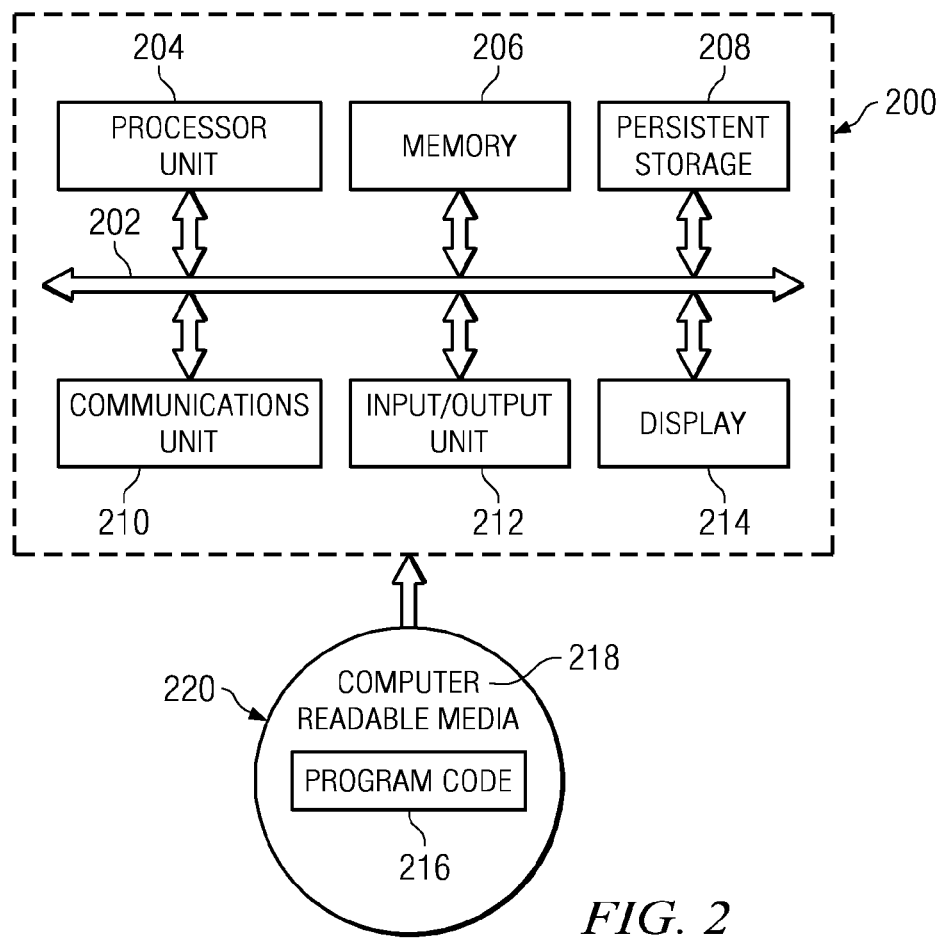
FIG. 2 is a diagram of a data processing system in accordance with an illustrative embodiment of the present invention.
Figure 3:
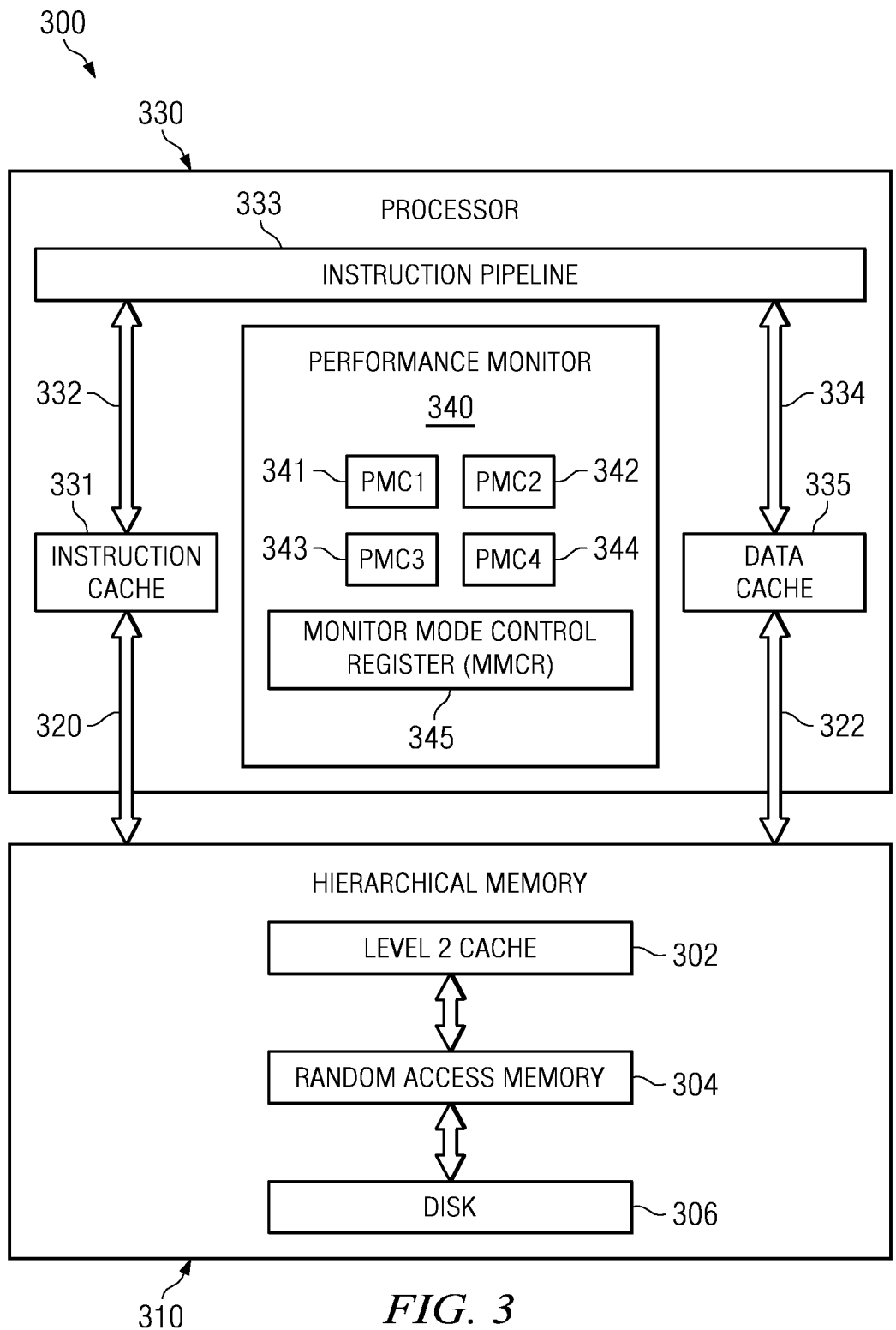
FIG. 3 is a block diagram illustrating hardware components used to provide performance data in accordance with an illustrative embodiment.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended or assert or imply any limitation with regard to the environments in which different embodiments may be implemented. Many modifications to the depicted environments may be made.

With reference first to FIG. 1, a diagram of a network of data processing systems is depicted in accordance with an illustrative embodiment. Network data processing system 100 is a network of computers in which different illustrative embodiments may be implemented. In this example, monitoring server computer 102 may exchange information with multiprocessor computer 104, computer 106, and computer 108. This exchange of information may occur with monitoring server computer 102 and monitoring sockets 110, 112, and 114.

Each of these sockets may be associated with a particular processor on multiprocessor computer 104, as well as on computers 106 and 108, which do not have multiple processors in these examples. In some advantageous embodiments, a particular socket may be associated with a particular thread on which monitoring is being performed. In yet other illustrative embodiments, multiprocessor computer 104 may send information over a single socket even though multiple processors are present.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214. Data processing system 200 may be used to implement a multi-threaded data processing system in these illustrative examples.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multiprocessor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code x16 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With reference now to FIG. 3, a block diagram illustrating hardware components used to provide performance data is depicted in accordance with an illustrative embodiment. System 300 comprises hierarchical memory 310 and processor 330. Hierarchical memory 310 comprises Level 2 cache 302, random access memory (RAM) 304 and disk 306. Level 2 cache 302 provides a fast access cache to data and instructions that may be stored in random access memory 304 in a manner that is well-known in the art. Random access memory 304 provides main memory storage for data and instructions that may also provide a cache for data and instructions stored on disk 306.

Data and instructions may be transferred to processor 330 from hierarchical memory 310 on instruction transfer path 320 and data transfer path 322. Instruction transfer path 320 and data transfer path 322 may be implemented as a single bus or as separate buses between processor 330 and hierarchical memory 310. Alternatively, a single bus may transfer data and instructions between processor 330 and hierarchical memory 310, while processor 330 provides separate instruction and data transfer paths within processor 330, such as instruction bus 332 and data bus 334.

Processor 330 also comprises instruction cache 331, data cache 335, performance monitor 340, and instruction pipeline 333. Performance monitor 340 comprises performance monitor counter (PMC1) 341, performance monitor counter (PMC2) 342, performance monitor counter (PMC3) 343, performance monitor counter (PMC4) 344, and monitor mode control register (MMCR) 345. Alternatively, processor 330 may have other counters and control registers not shown.

Processor 330 includes a pipelined processor capable of executing multiple instructions in a single cycle, such as the PowerPC family of reduced instruction set computing (RISC) processors. During operation of system 300, instructions and data are stored in hierarchical memory 310. Instructions to be executed are transferred to instruction pipeline 333 via instruction cache 331. Instruction cache 331 contains instructions that have been cached for execution within pipeline 333.

Some instructions transfer data to or from hierarchical memory 310 via data cache 335. Other instructions may operate on data loaded from memory or may control the flow of instructions.

Performance monitor 340 comprises event detection and control logic, including performance monitor counters 341-344 and monitor mode control register 345. Performance monitor 340 is a software-accessible mechanism intended to provide detailed information with significant granularity concerning the utilization of processor instruction execution and storage control. Performance monitor 340 may include an implementation-dependent number of performance monitor counters (PMCs) used to count processor/storage related events. These counters may also be termed "global counters".

The MMCRs establish the function of the counters with each MMCR usually controlling some number of counters. The PMCs and the MMCRs are typically special purpose registers physically residing on the processor. These registers are accessible for read or write operations via special instructions for that purpose. The write operation is preferably only allowed in a privileged or supervisor state, while reading is allowed in a problem state, since reading the special purpose registers does not change a register's content. In a different embodiment, these registers may be accessible by other means, such as addresses in I/O space. One skilled in the art will appreciate that the size and number of the counters and the control registers are dependent upon design considerations, including the cost of manufacture, the desired functionality of processor 330, and the chip area available within processor 330.

Performance monitor 340 monitors the entire system and accumulates counts of events that occur as the result of processing instructions. The MMCRs are partitioned into bit fields that allow for event/signal selection to be recorded/counted. Selection of an allowable combination of events causes the counters to operate concurrently. The event counts collected by performance monitor 340 are examples of performance data that may be accumulated and collected in accordance with the different illustrative embodiments.

The different illustrative embodiments recognize and take into account that current remote interfaces for collecting performance data collect information for all threads or processes during execution of applications or programs. The different advantageous embodiments recognize that collecting performance data in this manner uses up processor resources, such as those for performance monitor 340. Further, transmitting this performance data also takes up network resources in the form of the bandwidth needed to transfer the data to the remote interface. As a result, the different illustrative embodiments recognize that although memory space may be saved to some extent, the currently used techniques still may use more resources than desired.

Thus, the different illustrative embodiments provide a computer implemented method, apparatus, and computer usable program code for collecting performance data. In the different illustrative embodiments, signaling is performed to start a collection of performance data by an operating system support unit in a multithreaded data processing system.

In an illustrative embodiment, performance data is gathered and accumulated at the time when an operating system decided which thread to schedule to run next on a processor, so both outgoing and incoming threads are known. If the incoming thread is associated with a thread specific data collection profile, the performance data starts accumulation at the thread switch. For example, if a user wants to measure the total number of cache misses for the incoming thread at the thread switch, the corresponding performance counter would need to be read and the value stored, or the counter would need to be reset to zero. At the next thread switch, when the currently running thread is going to be switched out of the processor, that same counter needs to be read and the value used to calculate the number of cache misses caused by the thread of interest. In these illustrative embodiments, the thread specific data collection profile specifies a type of data to collect, an amount of data to collect, a format of data to collect, criteria of data collection, and a number of destinations for the collected performance data.

In response to a subsequent thread switch, the collected performance data is sent to the number of destinations. The data collection for the thread of interest finishes when the thread is switched out or becomes an outgoing thread. If the collected performance data needs to be sent to a destination, the collected performance data is sent to the destination in the number of destinations specified in the thread specific data collection profile. The collected performance data may be stored in a local memory buffer before, after, or instead of sending the data to a destination.

The different illustrative embodiments provide a capability to collect performance data on a per-thread basis rather than collecting all performance data during execution of an application. Also, specific types or amounts of data may be collected at different frequencies using the different illustrative embodiments. Further, the collection of this data is sent remotely and may be sent through sockets associated with particular processors. In this manner, the different illustrative embodiments reduce the amount of resources needed to collect performance data.

Figure 4:
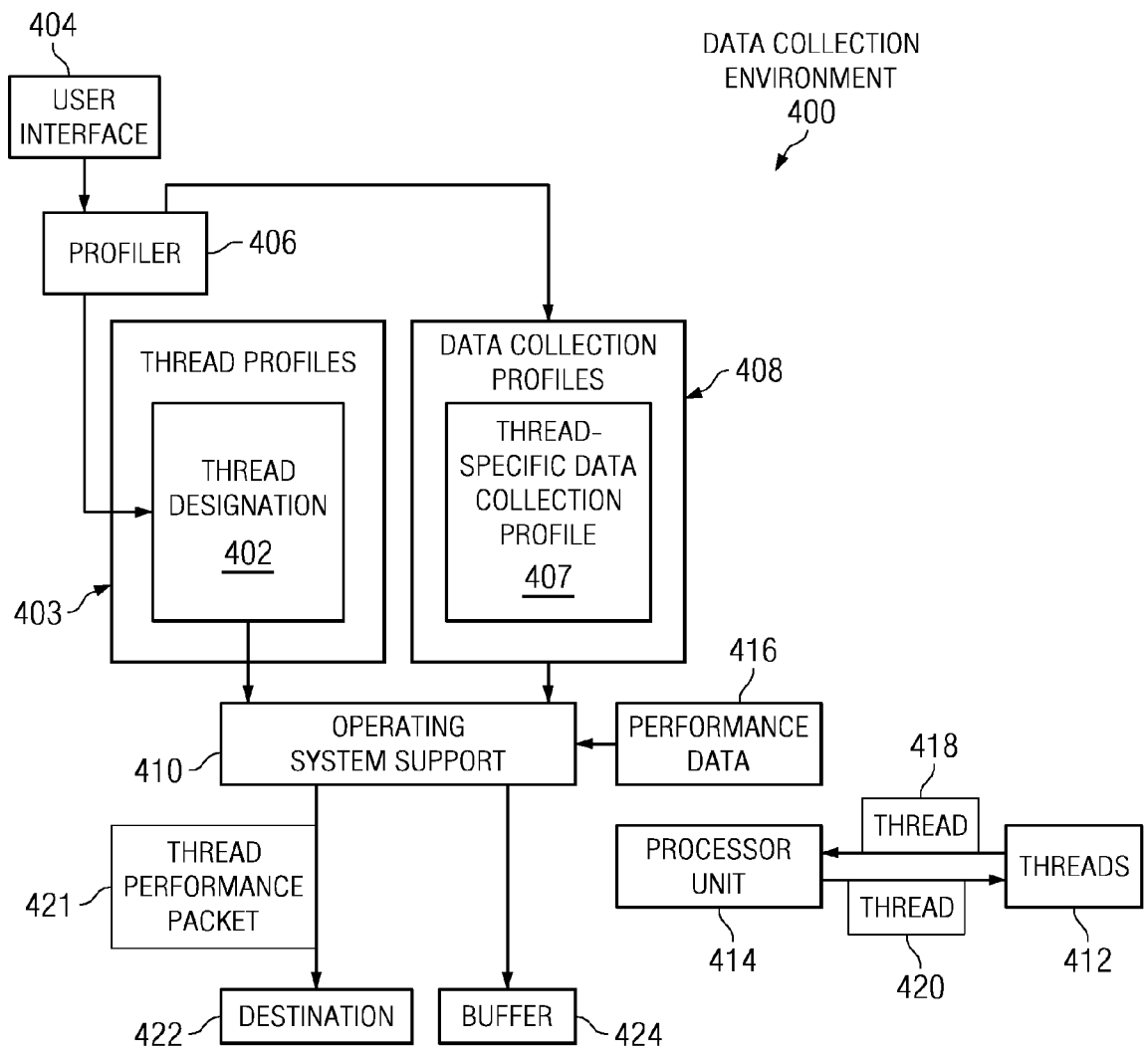
FIG. 4 is a diagram illustrating components used to collect performance data in accordance with an illustrative embodiment.

With reference to FIG. 4, a diagram illustrating components used to collect performance data is depicted in accordance with an illustrative embodiment. Data collection environment 400 is an example of components that are used to collect data. This environment may execute in a multithreaded data processing system in which multithreaded execution of thread occurs.

In this example, a user may generate thread designations, such as thread designation 402 in thread profiles 403, by generating user input through user interface 404 for profiler 406. The user also may provide and/or specify data collection profiles, such as thread specific data collection profile 407 in data collection profiles 408 through user interface 404. Thread designation 402 identify threads of interest for performance data collection. Data collection profiles 408 identify the manner in which data is to be collected. A thread specific data collection profile within data collection profiles 408 may be associated with one or more threads within thread designation 402.

Operating system support 410 may monitor the execution of threads 412 by processor unit 414. Operating system support 410 may include one or more components, depending on the particular implementation. For example, operating system support 410 may be at least one of a device driver, a dispatcher, a virtual machine, or some other combination of components. As used herein, the phrase "at least one of", when used with a list of items, means that different combinations of one or more of the items may be used and only one of each item in the list may be needed. For example, "at least one of item A, item B, and item C" may include, for example, item A, or item A and item B. This example also may include item A, item B, and item C, or item B and item C.

Processor unit 414 may contain a single processor or multiple processors or processor cores. For example, processor unit 414 may include one or more processors, such as processor 330 in FIG. 3. When multiple processors or processor cores are present, these processors may be heterogeneous or homogeneous depending on the particular implementation.

In these illustrative embodiments, operating system support 410 may collect performance data 416 using thread profiles 403 and data collection profiles 408. The operating system may support various metrics, such as, performance monitor counters, paging counters, memory allocation counters, or reason codes, such as, why the thread is being dispatched out, for example, that it lost its time slice or it is waiting for a lock. Operating system support 410 collects performance data 416 generated by processor unit 414 in a selective manner when a thread switch occurs. For example, thread 418 may be sent to processor unit 414 as an incoming thread for execution by processor unit 414, while thread 420 is an outgoing thread switched out and returned to threads 412 to await further execution. In the illustrative examples, an incoming thread is the thread that will become the current thread after a thread switch has taken place. Similarly, the outgoing thread is the thread that is currently executing but will be switched out of execution when the switch occurs.

Performance data 416 is collected when these thread switches occur, in these illustrative examples. Whether performance data 416 is collected is based on whether a thread specific data collection profile within data collection profiles 408 is associated with a particular thread.

For example, when thread 418 is dispatched to processor unit 414, operating system support 410 determines whether thread 418 is identified within thread designation 402 in thread profiles 403. Thread profiles 403 associate threads with profiles within data collection profiles 408. If thread 418 is found in a thread designation within thread profiles 403, a thread specific data collection profile, such as thread specific data collection profile 407 within data collection profiles 408, is identified for thread 418.

Operating system support 410 may signal to start or initiate the collection of performance data 416. Operating system support 410 may generate this signal in response to various events. In these illustrative examples, operating system support 410 sends a signal to processor unit 414 to begin collecting performance data. This collection of performance data may occur as soon as the data processing system begins executing an application. In other advantageous embodiments, the collection of performance data 416 may wait for other events.

For example, signaling may occur if execution of a thread starts in which the thread is associated with a thread designation within thread designation 402. Signaling to start data collection of performance data 416 also may occur if system performance reaches a specified threshold. This threshold may be, for example, a number of threads waiting for execution, a percent of resource usage, a specified threshold for performance, or some other suitable parameter. As used herein, "a number of" refer to an item or items refers to one for more items. For example, number of threads is one or more threads. For example, a data collection profile may specify to start measuring cache misses when at least 20 threads are executing, or 10 seconds after the start of the application to which the thread belongs.

Operating system support 410 determines whether this outgoing thread, thread 420, is associated with a thread specific data collection profile. In other words, operating system support 410 determines whether thread 420 is associated with a thread designation within thread profiles 403. If thread 420 is associated with a thread specific data collection profile, performance data such as performance data 416 is collected for thread 420. For example, counts stored by performance monitor 340 may be collected as part of performance data 416. Further, stack information and other information also may be collected by operating system support 410.

Operating system support 410 sends performance data 416 to a number of destinations. For example, operating system 410 may determine whether to send performance data 416 to destination 422 and/or buffer 424. This determination may be made using a thread specific data collection profile, in data collection profiles 408, associated with thread 420. Destination 422 may be, for example, a local disk drive, a remote data processing system, an application on the data processing system on which performance data 416 is collected, and/or some other suitable destination. In other illustrative embodiments, performance data 416 may be stored in a destination, such as buffer 424, until requested for analysis or sent to destination 422. Buffer 424 may be a default destination if one is not specified in data collection profiles 408.

Operating system support 410 sends performance data 416 in thread performance packet 421 to destination 422. Thread performance packet 421 is a packet or other data structure that contains performance data for a particular thread. In these illustrative examples, each packet is associated with a particular thread.

For example, Operating system support 410 may collect performance data for a first thread and a second thread in threads 412. A first thread specific data collection profile in data collection profiles 408 associated with the first thread specifies a first socket as a first destination in the number of destinations. A second thread specific data collection profile in data collection profiles 408 associated with the second thread specifies a second socket as a second destination in the number of destinations.

Operating system support 410 sends the collected performance data for the first thread to a first destination in the number of destinations through the first socket specified in the first thread specific data collection profile. Operating system support 410 sends the collected performance data for the second thread to a second destination in the number of destinations through the second socket specified in the second thread specific data collection profile. These destinations may be different processors on the same data processing system, different processors on different data processing systems, and/or other suitable destinations. The first and second thread may be threads for the same application or different applications in these illustrative examples.

Figure 5:
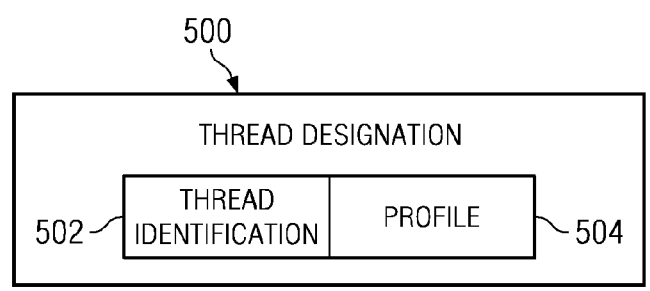
FIG. 5 is a diagram illustrating a thread designation in accordance with an illustrative embodiment.

With reference now to FIG. 5, a diagram illustrating a thread designation is depicted in accordance with an illustrative embodiment. Thread designation 500 is an example of a thread designation within thread designation 402 within thread profiles 403 in FIG. 4. As illustrated, thread designation 500 includes thread identification 502 and profile 504.

Thread identification 502 may take various forms. For example, this identification may be a thread name, an identification of a process to which a thread belongs, a thread type, an event, or some other suitable criteria for identifying a thread or number of threads. Profile 504 identifies a profile within data collection profiles 408 in FIG. 4. Profile 504 is used to identify the manner in which performance data is collected for the identified thread in thread designation 500. Thread designation 500 is one feature that provides a capability for selectively collecting performance data for threads executing within a multithreaded environment, such as data collection environment 400 in FIG. 4.

Figure 6:
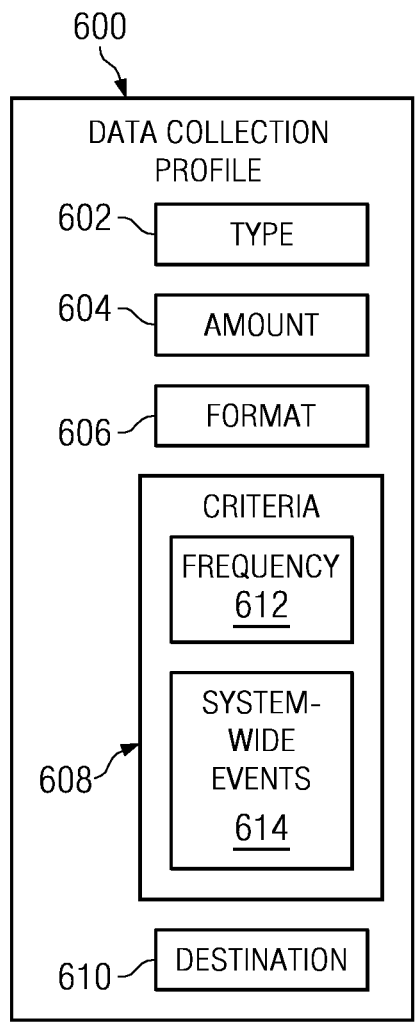
FIG. 6 is a diagram illustrating a thread specific data collection profile in accordance with an illustrative embodiment.

With reference now to FIG. 6, a diagram illustrating a data collection profile is depicted in accordance with an illustrative embodiment. Thread specific data collection profile 600 is an example of a data collection profile, such as thread specific data collection profile 407 within data collection profiles 408 in FIG. 4. Thread specific data collection profile 600 includes type 602, amount 604, format 606, criteria 608, and destination 610.

Type 602 identifies a type of data to be collected. This type of data may be, for example, at least one of stack data, memory allocation, system performance counter data, performance monitor counter data, counter data, processor utilization, timer status, and other suitable types of data. Amount 604 identifies the amount of data to be collected. The amount of data may be identified in a number of different ways. For example, the amount of data may be a value as to the size of the data. For example, amount 604 may be based on a size of a buffer allocated for performance data. In other illustrative embodiments, the amount may be based on statically defined buffers by the incoming thread being executed, dynamically defined buffers by the incoming thread being executed, a register map, or some other parameter. Format 606 identifies the format of the performance data. The format may be defined as 64 bit integers, a floating point value, or any other specification.

System performance counters may be operating system counters updated by the operating system and/or a global performance monitor counter. A global performance monitor counter may be hardware performance monitor counter that tracks values from different performance monitor counters in a processor unit. System performance counters contain values that track items, such as page faults, number of threads being dispatched out because of waiting on a log, number of threads being dispatched out because their time slice has expired, memory utilization for a process, processor utilization, number of threads executing, system functions calls, and/or other events.

Criteria 608 is the criteria of data collection. In these examples, criteria 608 may be frequency 612 and/or system-wide events 614. Frequency 612 is a frequency of data collection and indicates the frequency at which data should be collected for a particular thread. This frequency may be, for example, at least one of once, periodically, until a thread switch occurs, until a selected number of thread switches have occurred, until a thread has executed for at least a specified period of time, until system-wide criteria have occurred, and/or based on some other type of event. In another example, tracing the flow of execution to collect a trace for a set of branch instructions for the first 0.125 ms of the thread execution may be desired.

System-wide events 614 are events that occur throughout the operating system that may serve as criteria for data collection. System-wide events 614 may be, for example, at least one of a minimum number of threads executing on the system, processor utilization exceeding a specified threshold for a number of processors, memory utilization exceeding the specified threshold for a given process, and a system performance counter value exceeding the specified threshold. In other examples, other system-wide events may be used for system-wide events 614.

Destination 610 identifies where the performance data should be sent. Destination 610 may specify a number of destinations that may include, for example, a remote data processing system, the data processing system on which the performance data is collected, or some other suitable destination. The destination also may indicate that the data should go to a buffer. In some embodiments, if no data destination is identified in destination 610, the collected performance data is automatically placed in the buffer in the data processing system and/or sent to some other default destination.

With the use of thread specific data collection profile 600, the different advantageous embodiments provide another feature for further granularity in the manner in which performance data may be collected. By collecting only certain types of data and certain amounts of data at selected frequencies, the amount of performance data collected may be fine-tuned to what is needed, reducing the amount of data collected as compared to current data collection techniques. Further, thread specific data collection profile 600 also provides a capability to designate a destination for the data.

Figure 7:
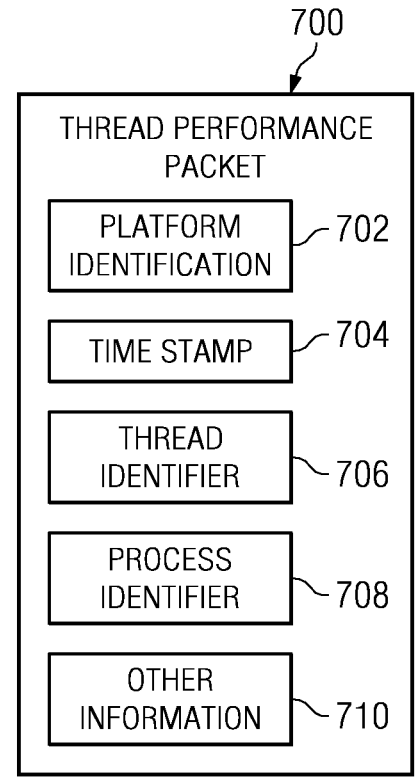
FIG. 7 is a diagram of a thread performance packet in accordance with an illustrative embodiment.

With reference now to FIG. 7, a diagram of a thread performance packet is depicted in accordance with an illustrative embodiment. Thread performance packet 700 is an example of thread performance packet 421 in FIG. 4. Thread performance packet 700 includes platform identification 702, time stamp 704, thread identifier 706, process identifier 708, and other information 710.

Platform 702 identifies the platform where the data was collected in a unique way within a set of platforms, which send their data to a unique destination. For example, the identification may include the name of a platform, the internet protocol (IP) address, the media access control (MAC) address, or some other suitable identifier. Time stamp 704 indicates when the data was collected, when collection was initiated, or when the data is sent to where all of this information may be recorded. Thread identifier 706 identifies the thread for which the performance data has been collected. Process identifier 708 identifies the process to which the thread belongs.

Other information 710 may include the actual performance data. For example, other information 710 may include call stack information, register values, counter values, or other suitable information. Thread performance packet 700 may be sent to a destination or a buffer depending on the particular implementation.

Figure 8:
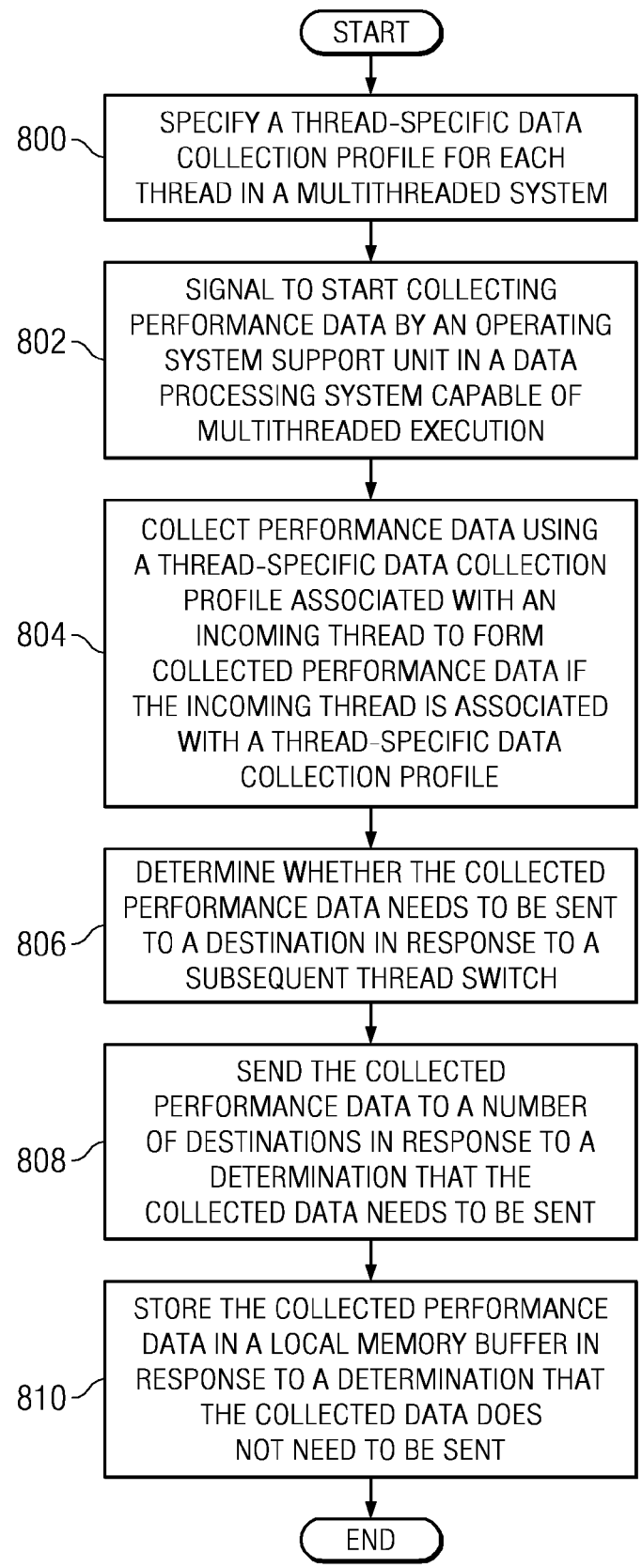
FIG. 8 is a flowchart of a process for collecting performance data in accordance with an illustrative embodiment.

With reference now to FIG. 8, a flowchart of a process for collecting performance data is depicted in accordance with an illustrative embodiment. The process illustrated in FIG. 8 may be implemented using components, such as those in data collection environment 400 in FIG. 4.

The process begins by specifying a thread specific data collection profile for each thread in a multithreaded system for which performance data is desired (step 800). This data collection profile may specify a type of data to collect. The data collection profile also may include an amount of data to collect, a format of data to collect, a frequency of data collection, and/or a destination for the data collection. Thread specific data collection profile 600 in FIG. 6 is an example of a thread specific data collection profile that may be generated in step 800. This thread specific data collection profile may then be associated with a particular thread in a thread designation such as, for example, thread designation 403 in FIG. 4.

The process then signals to start collecting performance data by an operating system support unit in a data processing system capable of multithreaded execution (step 802). The time at which the signal is generated to collect performance data may vary depending on the particular implementation. In some examples, the signal may be generated when an application begins execution.

In other illustrative examples, the signal may be generated when a selected amount of resources are being used within the data processing system. For example, signaling may occur when 80 percent of the resources in a data processing system are being used. Of course, this signal may be generated using other events or conditions depending on the particular implementation.

The process collects performance data after the signal has occurred using a thread specific data collection profile associated with an incoming thread to form collected performance data if the incoming thread is associated with a thread specific data collection profile (step 804). The process determines whether the collected performance data needs to be sent to a number of destinations in response to a subsequent thread switch (step 806). The process sends the collected performance data to a number of destinations in response to a determination that the collected data needs to be sent (step 808). The number of destinations may be specified in the thread specific data collection profile or may be a default number of destinations if none are specified by the thread specific data collection profile.

The process stores the collected performance data in a local memory buffer in response to a determination that the collected data does not need to be sent (step 810), with the process terminating thereafter. In some examples, the collected data may be analyzed. This analysis may be made using a component such as, for example, profiler 406 in FIG. 4. With this analysis, changes and improvements may be made to applications, configurations, hardware components, and other suitable components to improve the performance within the data processing system.

Figure 9:
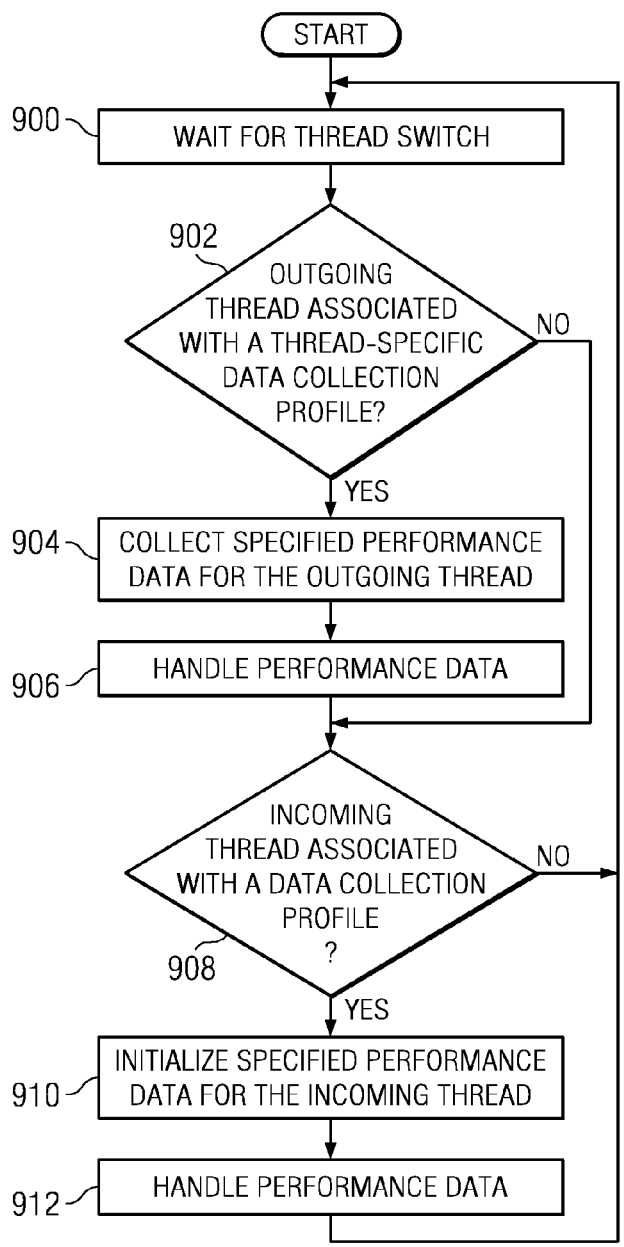
FIG. 9 is a flowchart of a process for performing data collection of performance data in accordance with an illustrative embodiment.

With reference now to FIG. 9, a flowchart of a process for performing data collection of performance data is depicted in accordance with an illustrative embodiment. The process illustrated in FIG. 9 may be implemented in a data collection environment, such as data collection environment 400 in FIG. 4. In particular, these steps may be implemented in a software component such as, for example, operating system support 410 in FIG. 4.

The process begins by waiting for a thread switch (step 900). When a thread switch is detected, a determination is made as to whether the outgoing thread is associated with a data collection profile (step 902). If the outgoing thread is associated with a thread specific data collection profile, the process collects specified performance data for the outgoing thread (step 904). The performance data is specified using a thread specific data collection profile, in these examples. The process handles the performance data (step 906). This handling of performance data may be, for example, sending the performance data to a number of destinations and/or storing the performance data in a local buffer. Step 906 is described in more detail below with respect to FIG. 10.

The process then determines whether an incoming thread is associated with a thread specific data collection profile (step 908). If the incoming thread is associated with a thread specific data collection profile, the process initializes the specified performance data for the incoming threads (step 910). The specified performance data may be specified in the thread specific data collection profile. The process then handles the performance data (step 912). For any thread of interest, data may be accumulated as specified in the thread specific data collection profile during execution.

For example, the thread specific data collection profile may specify accumulating data from the moment of execution of the incoming thread, until the moment the switch occurs to the outgoing thread. Data of interest is recorded or sent at both of these events. In operation 910, the required performance counters and/or memory storage needed for data collection are initialized to values needed for the thread specific data collection profile.

For example, a processor may have only two performance monitoring counters available at the time an operator desires to count cache misses and instructions executed for thread A and mispredicted branches and instructions for thread B. Thread A may switch to thread B during execution by the processor. This event initiates a change in the metric monitored by the performance monitor. The performance monitor may have the monitor mode control register values updated to start counting branch mispredictions instead of missed caches. In addition, the previous values of the performance monitor counters may also be restored or the values may be reset to zero as specified. The process then returns to step 900 as described above.

With reference again to step 908, if the incoming thread is not associated with a thread specific data collection profile, the process also returns to step 900. In step 902, if the outgoing thread is not associated with a thread specific data collection profile, the process proceeds to step 908 as described above.

Figure 10:
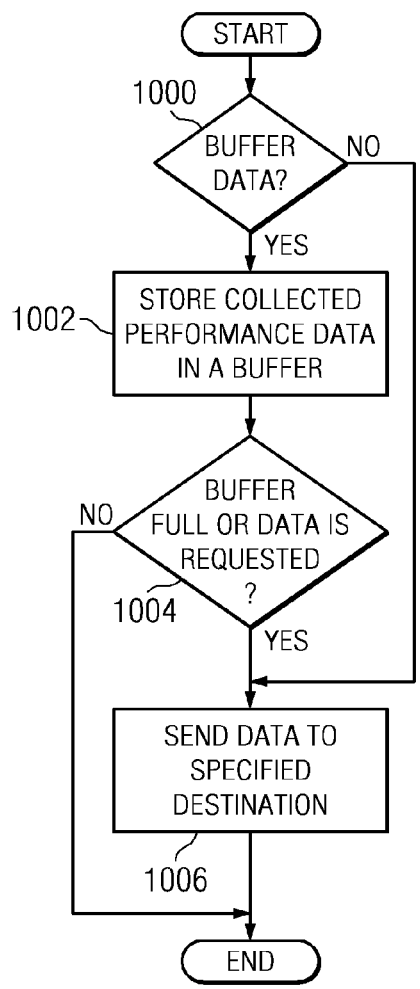
FIG. 10 is a flowchart of a process for handling performance data in accordance with an illustrative embodiment.

With reference now to FIG. 10, a flowchart of a process for handling performance data is depicted in accordance with an illustrative embodiment. In this example, the process in FIG. 10 is a more detailed illustration of step 906 and step 912 in FIG. 9.

The process begins by determining whether the data is to be buffered (step 1000). If the data is to be buffered, the collected performance data is stored in a buffer (step 1002). Next, a determination is made as to whether the buffer is full or the data has been requested (step 1004). If the buffer is full or the data has been requested, the data is sent to a specified destination (step 1006), with the process terminating thereafter. In these illustrative examples, the specified destination covers both the destination that may be specified in a thread specific data collection profile and/or a destination that requests the data.

With reference again to step 1000, if the data is not to be buffered, the process proceeds directly to step 1006. In step 1004, if the buffer is not full or if the data has not been requested, the process terminates.

Figure 11:
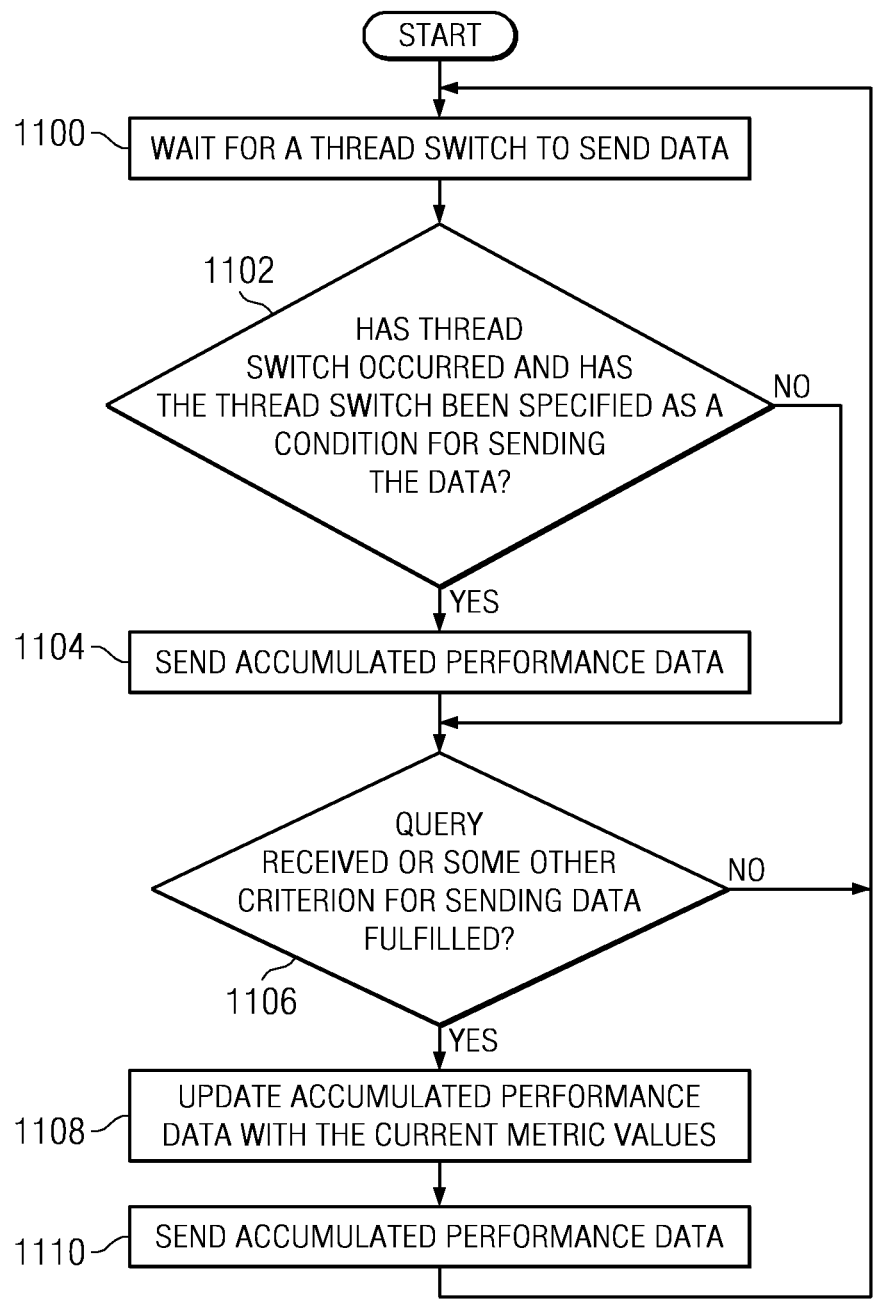
FIG. 11 is a flowchart of a process for sending accumulated performance data in accordance with an advantageous embodiment.

With reference now to FIG. 11, a flowchart of a process for sending accumulated performance data is depicted in accordance with an advantageous embodiment. The process illustrated in FIG. 11 is a more detailed process for operation 808 in FIG. 8.

The process begins by waiting for a thread switch to send data (operation 1100). In these illustrative examples, the thread switch is one example of a condition that may be specified for sending data. In other illustrative embodiments, the process may wait for some other specified condition such as, for example, a remote query or some other suitable specified condition. In some illustrative embodiments, the specified condition may be a condition that occurs periodically.

The process then determines whether a thread switch has occurred and whether the thread switch has been specified as a condition for sending the data (operation 1102). If the thread switch has occurred and the thread switch has been specified as a condition for sending the data, the process sends the accumulated performance data (operation 1104). The process then determines whether a query has been received and/or whether some other specified condition for sending the data has been fulfilled (operation 1106). This other specified condition may be a thread switch, a remote query, or some other condition for sending the data. If a query has not been received and if no specified conditions for sending data have been fulfilled, the process then returns to operation 1100 as described above.

Otherwise, if a query has been received or if some other specified condition for sending the data has been fulfilled, the process then updates the accumulated performance data with the current metric values (operation 1108). After operation 1108 has been completed, the process then sends the accumulated performance data (operation 1110), with the process returning to operation 1100 as described above.

With reference again to operation 1102, if a thread switch has not occurred and/or the thread switch has not been specified as a condition for sending the data, the process then advances directly to operation 1106. In this manner, the user may specify certain conditions for the sending of data as well as receive performance data in response to a single query.

Thus, the different illustrative embodiments provide a computer implemented method, apparatus, and computer usable program code for collecting performance data. In the different illustrative embodiments, signaling may be performed to start collecting performance data by an operating system support unit in a multithreaded data processing system. In response to a thread switch to an incoming thread, the performance data is collected using a thread specific data collection profile associated with the current running thread to perform collective performance data if the incoming thread is associated with the thread specific data collection profile.

This thread specific data collection profile specifies the type of data to collect, the amount of data to collect, the format of data to collect, a frequency of data collection, and a number of destinations for the collected performance data. In response to a subsequent thread switch, the collected performance data is sent to a number of destinations using the thread specific data collection profile. If a number of destinations are not specified, the collected performance data may be stored in a local memory buffer.

The different illustrative embodiments provide a capability to specify the collection of data based on individual threads. The different illustrative embodiments also provide a capability to specify the type of data, amount of data, and the frequency of data collection for particular threads. In this manner, the amount of data sent to a remote data processing system may be reduced. Additionally, the amount of data collected and stored locally also may be reduced through this type of data collection approach. As a result, the use of various network and computer resources may be reduced in analyzing the performance of a multithreaded system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for collecting performance data, the computer implemented method comprising:
signaling to start collecting the performance data by an operating system support unit in a multithreaded data processing system capable of multithreaded execution;
responsive to a thread switch to an incoming thread after signaling has occurred, collecting the performance data for the incoming thread using a thread specific data collection profile to form collected performance data if the incoming thread is associated with the thread specific data collection profile, wherein the thread specific data collection profile specifies a type of data to collect wherein a first thread specific data collection profile associated with a first thread specifies a first socket as a first destination and wherein a second thread specific data collection profile associated with a second thread specifies a second socket as a second destination; and
responsive to a subsequent thread switch, sending the collected performance data to a number of destinations, wherein the sending step comprises:
sending first collected performance data for the first thread to the first destination in the number of destinations through the first socket specified in the first thread specific data collection profile; and
sending the second collected performance data for the second thread to the second destination in the number of destinations through the second socket specified in the second thread specific data collection profile.

2. The computer implemented method of claim 1 further comprising:
specifying the thread specific data collection profile for each thread in a multithreaded system, wherein the thread specific data collection profile specifies at least one of the type of data to collect, an amount of data to collect, a format of data to collect, criteria of data collection, and the number of destinations for the collected performance data.

3. The computer implemented method of claim 2, wherein the criteria of data collection comprises a frequency of data collection, and wherein the frequency of data collection comprises at least one of once, periodically, until the thread switch occurs, until a selected number of thread switches have occurred, until a thread has executed for at least a specified amount of time since a last data collection, and until system-wide criteria have been satisfied.

4. The computer implemented method of claim 2, wherein the criteria of data collection comprises system-wide events, and wherein the system-wide events comprise at least one of an operating system counter exceeding a first specified threshold and performance monitor counter exceeding a second specified threshold.

5. The computer implemented method of claim 1, wherein the collecting step comprises:
responsive to the thread switch to the incoming thread after the signaling has occurred, collecting the performance data for the incoming thread using the thread specific data collection profile to form the collected performance data if the incoming thread is associated with the thread specific data collection profile and criteria of data collection specified in the thread specific data collection profile has been met.

6. The computer implemented method of claim 1, wherein the type of data to collect comprises at least one of stack data, memory allocation, system performance counter, performance monitor counter data, processor utilization, and timer status.

7. The computer implemented method of claim 1, wherein the thread specific data collection profile further specifies an amount of data to collect, and wherein the amount of data to collect comprises at least one of statically defined buffers by the incoming thread being executed and dynamically defined buffers by the incoming thread being executed.

8. The computer implemented method of claim 1, wherein the sending step comprises:
responsive to the subsequent thread switch, sending the collected performance data to the number of destinations in a number of thread performance packets, wherein each of the number of thread performance packets comprises at least one of a platform identification, a time stamp, a thread identifier, and a process identifier.

9. The computer implemented method of claim 1,
wherein the sending step further comprises:
determining whether to send performance data to one of a destination in the number of destination and a buffer, wherein the determination is made using the thread specific data collection profile, wherein the destination is one of a local disk drive, a remote data processing system, and an application on the data processing system on which performance data is collected, and wherein the buffer stores the performance data until requested for analysis or sent to the destination and the buffer is a default destination when the destination is not specified in the thread specific data collection profile.

10. The computer implemented method of claim 9, wherein the destinations comprise at least one of different processors on the same data processing system, different processors on different data processing systems, and a combination thereof, and wherein the first thread and the second thread are one of associated with a same application and associated with different applications.

11. A multithreaded data processing system comprising:
a bus;
a communications unit connected to the bus;
a storage device connected to the bus, wherein the storage device includes program code; and
a processor unit connected to the bus, wherein the processor unit executes the program code to signal to
start collecting performance data by an operating system support unit in the multithreaded data processing system;
collect the performance data for an incoming thread using a thread specific data collection profile to form collected performance data in response to a thread switch to an incoming thread after signaling has occurred if the incoming thread is associated with the thread specific data collection profile, wherein the thread specific data collection profile specifies a type of data to collect, wherein a first thread specific data collection profile associated with a first thread specifies a first socket as a first destination and wherein a second thread specific data collection profile associated with a second thread specifies a second socket as a second destination; and
send the collected performance data to a number of destinations in response to a subsequent thread switch, wherein the sending further comprises:
send first collected performance data for the first thread to the first destination in the number of destinations through the first socket specified in the first thread specific data collection profile; and send the second collected performance data for the second thread to the second destination in the number of destinations through the second socket specified in the second thread specific data collection profile.

12. The multithreaded data processing system of claim 11, wherein the processor unit further executes the program code to specify the thread specific data collection profile for each thread in a multithreaded system, wherein the thread specific data collection profile specifies at least one of the type of data to collect, an amount of data to collect, a format of data to collect, criteria of data collection, and a number of destinations for the collected performance data.

13. The multithreaded data processing system of claim 12, wherein the criteria of data collection comprises a frequency of data collection, and wherein the frequency of data collection comprises at least one of once, periodically, until the thread switch occurs, until a selected number of thread switches have occurred, until a thread has executed for at least a specified amount of time since a last data collection, and until system-wide criteria have been satisfied.

14. The multithreaded data processing system of claim 12, wherein the criteria of data collection comprises system-wide events, and wherein the system-wide events comprise at least one of a minimum number of threads executing on a system, processor utilization exceeding a specified threshold for a number of processors, memory utilization exceeding the specified threshold for a given process, and a system performance counter value exceeding the specified threshold.

15. The multithreaded data processing system of claim 11, wherein in executing the program code to collect the performance data for an incoming thread using a thread specific data collection profile to form collected performance data in response to a thread switch to an incoming thread after signaling has occurred if the incoming thread is associated with the thread specific data collection profile, the processor executes the program code to collect the performance data for the incoming thread using the thread specific data collection profile to form the collected performance data in response to the thread switch to the incoming thread after the signaling has occurred if the incoming thread is associated with the thread specific data collection profile and the criteria of data collection specified in the thread specific data collection profile has been met.

16. A computer program product for collecting performance data, the computer program product comprising:

a computer recordable storage medium;

program code, stored on the computer recordable storage medium, for signaling to start collecting the performance data by an operating system support unit in a multithreaded data processing system;

program code, stored on the computer recordable storage medium, responsive to a thread switch to an incoming thread after signaling has occurred, for collecting the performance data for the incoming thread using a thread specific data collection profile to form collected performance data if the incoming thread is associated with the thread specific data collection profile, wherein the thread specific data collection profile specifies a type of data to collect;

program code, stored on the computer recordable storage medium, responsive to a subsequent thread switch, for sending the collected performance data to a number of destinations, wherein the program code, stored on the computer recordable storage medium for sending the collected performance data to a number of destinations further comprises:

program code, stored on the computer recordable storage medium for sending a first collected performance data associated with a first thread to a first destination among the number of destinations through a first socket specified as the first destination in the first thread specific data collection profile; and program code, stored on the computer recordable storage medium for sending a second collected performance data associated with a second thread to a second destination among the number of destinations through a second socket specified as the second destination in the second thread specific data collection profile.

17. The computer program product of claim 16 further comprising:

program code, stored on the computer recordable storage medium, for specifying the data collection profile for each thread in a multithreaded system, wherein the data collection profile specifies at least one of the type of data to collect, an amount of data to collect, a format of data to collect, the criteria of data collection, and a number of destinations for the collected performance data.

18. The computer program product of claim 17, wherein the criteria of data collection comprises a frequency of data collection, and wherein the frequency of data collection comprises at least one of once, periodically, until the thread switch occurs, until a selected number of thread switches have occurred, until a thread has executed for at least a specified amount of time since a last data collection, and until system-wide criteria have been satisfied.

19. The computer program product of claim 17, wherein the criteria of data collection comprises system-wide events, and wherein the system-wide events comprise at least one of a minimum number of threads executing on a system, processor utilization exceeding a specified threshold for a number of processors, memory utilization exceeding the specified threshold for a given process, and a system performance counter value exceeding the specified threshold.

20. The computer program product of claim 16, wherein the program code, stored on the computer recordable storage medium, for collecting the performance data for an incoming thread using the thread specific data collection profile to form collected performance data in response to the thread switch to the incoming thread after signaling has occurred if the incoming thread is associated with the thread specific data collection profile comprises:

program code, stored on the computer recordable storage medium, responsive to the thread switch to the incoming thread after the signaling has occurred, collecting the performance data for the incoming thread using the thread specific data collection profile to form the collected performance data if the incoming thread is associated with the thread specific data collection profile and the criteria of data collection specified in the thread specific data collection profile has been met.

* * * * *